June 7, 1932.   L. A. LAURSEN   1,862,314
METHOD FOR FORMING RUBBER TIRES
Original Filed April 3, 1924   2 Sheets-Sheet 1
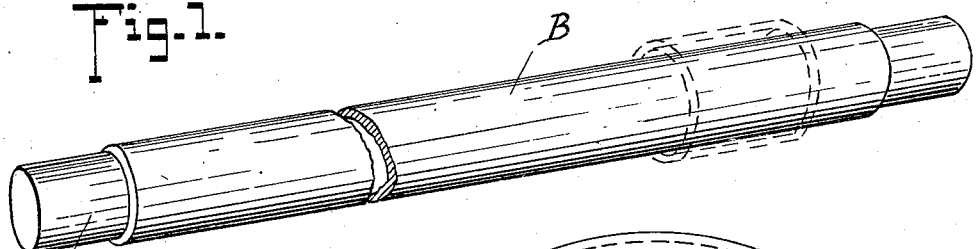
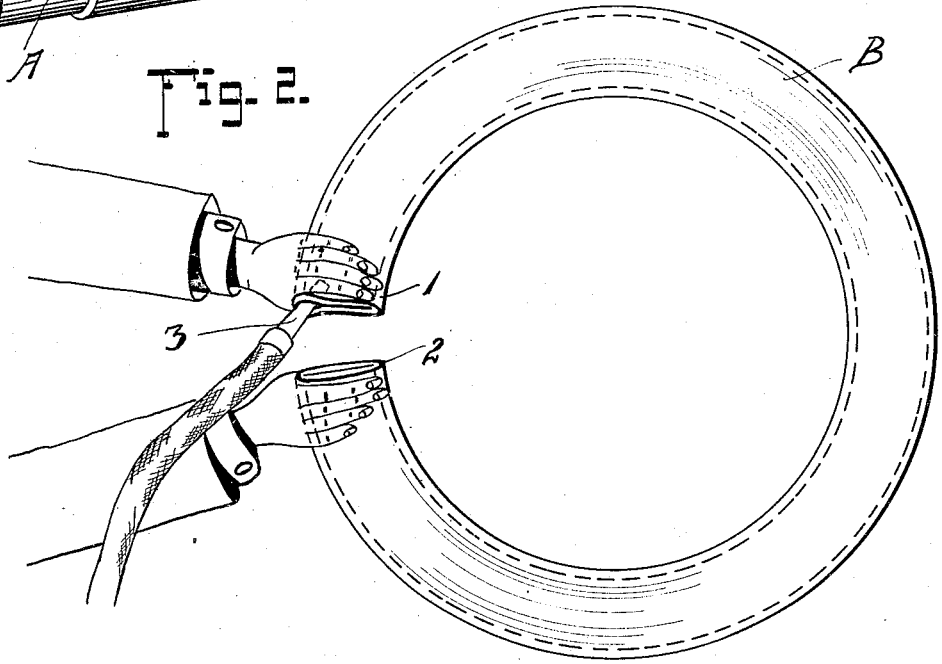
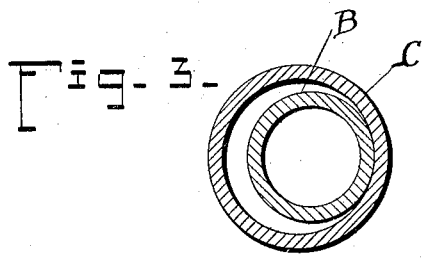
INVENTOR.
L. A. Laursen.
BY
ATTORNEYS.

June 7, 1932.  L. A. LAURSEN  1,862,314
METHOD FOR FORMING RUBBER TIRES
Original Filed April 3, 1924   2 Sheets-Sheet 2

INVENTOR.
L. A. Laursen.
BY
ATTORNEYS.

UNITED STATES PATENT OFFICE

LAURITS A. LAURSEN, OF AKRON, OHIO, ASSIGNOR OF ONE-FOURTH TO PEARL LUCILE LAURSEN, OF AKRON, OHIO

METHOD FOR FORMING RUBBER TIRES

Original application filed April 3, 1924, Serial No. 704,042. Divided and this application filed June 30, 1928. Serial No. 289,499.

This application is a division of my pending application for patent, Serial No. 704,042, filed April 3rd, 1924.

My invention has to do with rubber manufactures and its essential object is the material reduction in the cost of producing tubular or hollow rubber articles.

I shall describe and illustrate my invention disclosed herein as it is adapted for the manufacturing of rubber inner tubes for tires, and particularly such tubes as are used for large tires of the class applied to wheels of trucks, and also the larger tubes employed for balloon tires that are now assuming great commercial importance in the operation of tire equipped vehicles.

But it is to be understood that I do not limit my invention to the uses above directly outlined because it involves a new process or method that is susceptible of employment, as regards certain peculiar principles or steps availed of, for the purpose of making hollow rubber articles, of many different kinds, and especially circular rubber articles.

In the carrying out of this invention. to bring a tube to proper size, or diameter, or to give curved or circular form to a tire inner tube, I utilize fluid pressure expansion in a novel manner to stretch the uncured rubber tube with uniform or even action over the entire surface thereof, relieve it of the action of the fluid pressure, and subsequently cure or vulcanize the article to render permanent the form given. The last step may involve the employment of any of the well known curing apparatus and methods.

More specifically stated the invention as to a single and important commercial adaptation, resides in making a rubber tube of circular form by rolling the uncured rubber on a straight mandrel or pole; stripping it therefrom while in its raw state; then arranging the uncured rubber tube in an approximately circular condition or merely bringing its ends proximate to one another will suffice, in fact; closing the ends of the tube; inflating the tube and thus stretching it by expanding the rubber stock with equalized pressure on all its walls so that there is provided an outer circumferential wall of substantially the same thickness as the inner circumferential wall but of greater length; and finally curing the tube by any suitable method or apparatus.

The expanding or stretching as above described according to my invention is done in the open, or not under ordinary atmospheric pressure, and is depended on not only to cause the tubular rubber stock to stretch in a manner to insure a substantially definite thickness of wall structure, but obviously, the operator may with ease control the size to which the particular tube is expanded in order to obtain desired sectional diameters. It is notable that the uncured rubber stock is soft, pliable and lacking in that resiliency derived from vulcanization which would cause it to reassume its original condition, when placed under tension. I take advantage of this fact in using my expanding process, for after my step of expansion by fluid pressure internally of the tube, the raw rubber stock practically becomes set as of the desired circular form and cross sectional diameters, these becoming permanent upon final curing.

The various advantages of my process and apparatus will be quite evident from annexed description and from illustrative data, including the accompanying drawings, embodying:—

Figure 1 is a view in perspective of a mandrell or pole on which the rubber stock is initially rolled to give it a hollow or tubular form.

Figure 2 is a perspective view in which the uncured rubber tube is shown clamped at its ends by the hands (or any mechanical clamp means might be used) and the fluid pressure supply pipe or nozzle arranged as in the operation of expanding the tube to proper size of inflation.

Figure 3 is a perspective view of a round mandrel inside which the uncured tube is placed for stretching and previous to its final curing in the vulcanizing apparatus.

Figure 4:
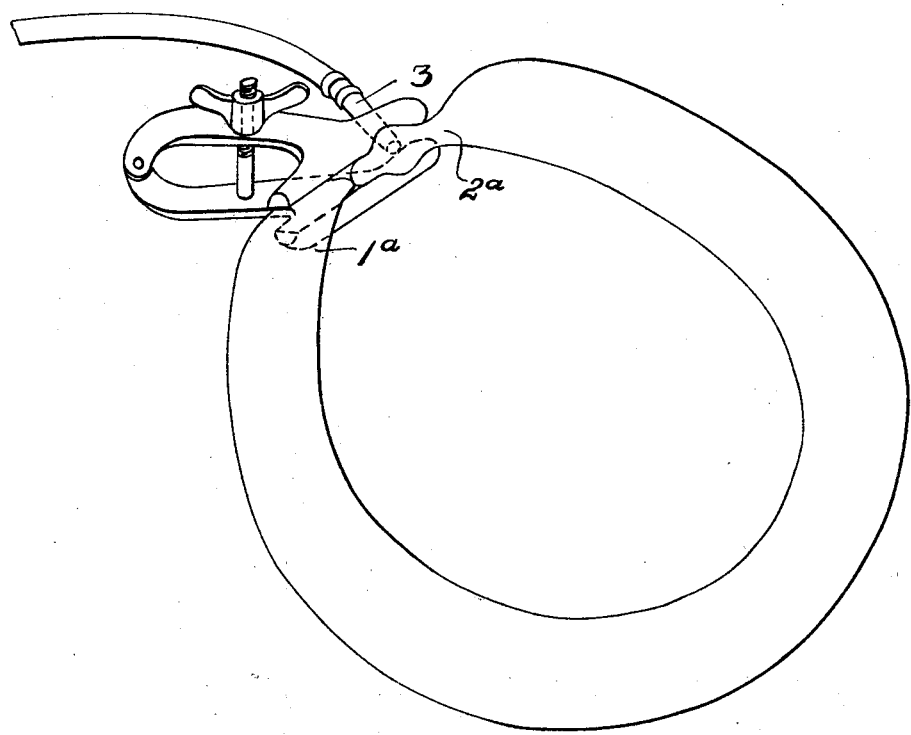
Figure 4 is a perspective view showing a method of closing the ends of the tube.

I refer now to Figure 1 wherein is shown the straight mandrel or pole A on which the rubber stock is rolled to provide the raw or uncured tube or hollow article B, to be hereinafter referred to as a tube. The pole A gives to the tube B a predetermined diameter, and when the tube has thus been rolled it is covered exteriorly with soap-stone, mica, or other suitable substances preventing stickiness of the then outside surface of the tube B. A straight tube may be formed in other ways than that above described, however.

The uncured tube is now ready to be stripped from the pole A and this is done in the usual manner thereby reversing the outer and inner sides, i. e., turning the tube inside out so to speak.

The next step is to clamp the open ends of the tube closed manually as shown in Figure 2, or mechanically as shown in Figure 4.

The tube is now ready to be deformed by stretching to a desired cross sectional diameter and predetermined circular form. Such diameter is illustrated in Figure 2. Previous to the deforming, the tube is of course wrinkled on its inner circumference, caused by bringing its ends adjacent to one another to give it curvature. The expansion removes the wrinkling entirely of course, in fact the feasibility of my new method is predicated upon the recognition that this wrinkling of the tube when bent may be wholly done away with through my process and that desired substantially uniform thickness of the tire wall may be obtained by the equalized expansion or deformation of the uncured rubber stock under internal fluid pressure.

The ends of the tube B being suitably clamped closed as shown at 1 and 2 in Figure 2, and 1a and 2a in Figure 4, a nozzle 3 inserted into one of the closed clamped ends is caused to supply from the hose 4, air under pressure, and the expanding of the tube by inherent stretching of the rubber stock takes place. In practice this expanding only requires fluid under pressure of one or two pounds though I do not wish to be restricted to any exact amount of pressure so long as that used is effective for the purposes of my invention.

As the fluid (air preferably) enters the tube B the rubber stock is stretched uniformly over its whole area and the tube takes a definite annular or curved form, with a fixation of the inner and outer arcs of curvature by reason of the stretching of the rubber. I have found by experimenting that when arranged as in Figure 2, the tube takes a defined circular or annular form upon inflation and the extent of inflation alone determines the cross sectional area thereof. The ease with which such area may be varied is clear from the foregoing and is a flexible feature of my method that has no counterpart in the art to which my invention relates, so far as I am aware.

The extent of the enlargement of the cross sectional area of the tube by inflation may be controlled by placing the tube in its uncured state inside a mandrel C as illustrated in Figure 3, the inflation being effected while the uncured tube is so arranged, and the pressure of the inflation being sufficient to limit the deformation of the tube to the proper size desired for the ultimate finished product. The mandrel C is curved.

After the stretching of the tube in the mandrel C has been effected in the above manner, said tube will have assumed the desired size of the finished article because owing to the stretchability of the uncured rubber, the inflating process acts in the manner previously suggested to give the tube the desired enlarged cross sectional form. Having deformed the tube as stated, the only remaining operation to be effected is the curing of the article and this may be done in any of the usual ways known in commercial practice to those versed in the art. An hydraulic process of curing forming a separate invention from this may be resorted to if desired.

I am advised of the known process of making large "full molded" tubes by building up the tube, splicing the ends together while uncured, placing in a mold made of the correct size, and inflating the tube with gas to press it to the walls of the mold, under which pressure and contact it is vulcanized. This is an expensive mode of making tubes and air cannot of course be used because the rubber would be ruined thereby during vulcanization.

The most common way of manufacturing tubes is to build up the tube on a circular mandrel or pole by winding a strip of rubber spirally about the mandrel in the known manner of overlapping the edges to give the smaller inner diameter or circular form the tube. A tube made this way must be wrapped with cloth, as otherwise it would be entirely too rough on the outside, the latter becoming the inside when the tube is stripped from the mandrel and cured. The amount of labor and time consumed in the foregoing process is very great as the winding of the rubber strip is all done by manual labor and is tedious and time consuming work. By my process the cost of the tube is reduced nearly one half as compared with the method heretofore used and the labor item as to time is almost negligible. The tremendous economy effected with the use of my process is a great advance in the art from a practical or commercial viewpoint.

Now while my invention has especial utility for tire tube making purposes, I do not wish to be restricted thereto. I claim broadly the invention of deforming by stretching to ultimate form or shape the rubber stock or raw rubber prior to vulcanization, as to my method and my machine. I claim broadly also the foregoing invention to give proper diameter or other form to a tubular article or the desired curvature to a tire tube.

If desired after affixing the size of my tube by stretching inside a mandrel through the use of air inflation or other fluid pressure inflation, release of the pressure on the tube may be performed and the tube then placed afterward on a suitable mandrel when it is to be cured. The pressure of atmospheric conditions is immaterial. Moreover, the inflating action might be applied to obtain the stretching principle of result, for an article not of tubular form but of a hollow nature.

Figure 3 shows that when my uncured tube is placed in the mandrel C, it is of smaller cross section than the mandrel. When expanded by the means employed for the purpose, it will be stretched to the larger cross section of the mandrel C and will be cured in such condition. The size of the mandrel, therefore, controls the ultimate commercial size of the tube in an obvious manner.

Having thus described my invention, what I claim as new and desire to secure by Letters Patent of the United States, is:—

1. The process of making inner tubes for rubber tires, which consists in taking a strip of uncured rubber stock, such as commonly employed for making rubber inner tubes and forming said strip into a long tubular shape, causing this uncured long tubular shaped article to be applied to a curved mandrel and its walls deformed by expansion to enlarge its cross sectional area to the size of the final tubular article which is to be made therefrom, using the mandrel to control the maximum stretching action aforesaid, and thereafter subjecting the tubular article thus stretched to proper diameter to vulcanizing temperature to produce the finished curved article.

2. The process of making inner tubes for tires, which consists in taking a flat strip of uncured rubber stock, rolling the said stock into the usual long tubular shape necessary for the final tire tube to be made, then subjecting the uncured tubular article thus prepared to an internal deforming stretching pressure while the article is disposed inside a curved mandrel of larger diameter than the rolled tube so that the maximum stretching of the article will be limited by the mandrel and thus fix the ultimate diameter of the article produced, and thereafter curing the deformed uncured article under vulcanizing temperature to fix it in its final form and diameter produced as aforesaid.

3. The process of making rubber inner tubes for tires, which consists in taking a flat long strip of uncured rubber stock and causing it to be rolled into a long tubular form, disposing said uncured tubular article inside a mandrel of larger diameter than the rolled tube with the article curved into a substantially circular condition, subjecting the article to internal deforming stretching pressure so that the walls of the uncured stock will be stretched and deformed to an enlarged diameter as may be limited by the size of the mandrel, and then causing the uncured substantially round tubular article thus stretched and produced of the desired diameter to a curing temperature for finishing it and fixing its shape.

4. The process of making rubber inner tubes for tires, which consists in forming a long flat strip of uncured rubber stock into a long tubular shape commonly employed for rubber tube manufacture, placing said long tubular article thus produced into a somewhat circular condition similar to the circular condition of its ultimate finished form, disposing the thus prepared article inside a mandrel of a larger diameter corresponding with the general diameter of the tube which is to be ultimately finished, subjecting the tubular article thus prepared and arranged to internal stretching and deforming fluid pressure action to stretch the walls of the uncured stock to enlarge its cross section to an extent limited by the mandrel, and thereafter curing the article so that it will retain the shape in its finished form of the cross sectional area produced by deforming it while in uncured condition.

5. The process of making rubber tubes for tires, which includes these several steps; the preliminary forming of a strip of raw rubber stock into a tube, the bending of the tube to a round condition in general conformance with that it will assume in the tire for which it may be later used, the disposing of the thus bent tube inside a mandrel of larger diameter than the tube, the inflating of the tube to deform the raw stock thereof to a size determined by said mandrel and sufficiently to cause the tube to have the cross sectional area of the final finished article, and the curing of the tube in the inflated deformed condition aforesaid.

6. The process of making rubber tubes for tires, which includes these several steps; the preliminary forming of a strip of raw rubber stock into a tube, the bending of the tube to a round condition in general conformance with that it will assume in the tire for which it may be later used, the disposing of the thus bent tube inside a mandrel of larger diameter than the tube, and in which the tube is free to move and to be deformed outwardly from its inner arc of curvature, the inflating of the tube to stretch or expand its body to one of larger cross sectional area determined by the size of the mandrel aforesaid, and the curing of the tube when so deformed to finish it for commercial use.

In testimony whereof I affix my signature.

LAURITS A. LAURSEN.